United States Patent

Don et al.

[11] Patent Number: 6,142,029
[45] Date of Patent: Nov. 7, 2000

[54] AXOID FORCE MECHANISM

[75] Inventors: Evgenny Alexeevich Don, P.O. Box 1860, Bishkek, 720000; Florid Borisovich Kim, Bishkek; Leonid Borisovich Kim, Bishkek, all of Kyrgyzstan

[73] Assignee: Evgenny Alexeevich Don, Bishkek, Kyrgyzstan

[21] Appl. No.: 09/230,249

[22] PCT Filed: Aug. 1, 1996

[86] PCT No.: PCT/KG96/00001

§ 371 Date: Jan. 22, 1999

§ 102(e) Date: Jan. 22, 1999

[87] PCT Pub. No.: WO98/05885

PCT Pub. Date: Feb. 12, 1998

[51] Int. Cl.$^7$ .................................................. F16H 21/16
[52] U.S. Cl. .................................................. 74/25; 74/63
[58] Field of Search .................................................. 74/25, 63

[56] References Cited

U.S. PATENT DOCUMENTS 3,916,700  11/1975  Adolfsson ................................. 74/25
4,034,613  7/1977  Halfhill et al. ............................ 74/25

FOREIGN PATENT DOCUMENTS 815366  3/1981  U.S.S.R. .
11067267  1/1984  U.S.S.R. .
1222948  4/1986  U.S.S.R. .

OTHER PUBLICATIONS

English Abstract of SU 1222948 of Apr. 1986.
English Abstract of SU 1067267 of Jan. 1984.
English Abstract of SU 815366 of Mar. 1981.

*Primary Examiner*—David Fenstermacher
*Attorney, Agent, or Firm*—Ladas & Parry

[57] ABSTRACT

An axoid force mechanism has first and second end elements, at least one of the end elements being arranged for progressive movement. First and second stocks are respectively on the first and second end elements, the first and second stocks respectively having first and second supporting surfaces that are at least portions of circular cylinders. A first intermediate member has first and second supporting surfaces that are at least portions of circular cylinders respectively engaged with the first and second supporting surfaces of the first and second stocks for rolling thereon when the one of the end elements moves progressively.

29 Claims, 3 Drawing Sheets

AXOID FORCE MECHANISM

BACKGROUND OF THE INVENTION

This invention relates to machinery and, more particularly to mechanisms for transformation of force and speed parameters of progressive and rotary movements.

Lever mechanisms raising forces within one work cycle and transforming progressive and rotary movements are widely used (see Artobolevsky I. I., "Theory of Machines and Mechanisms", Moscow: "Science", 1975).

There exists the lever mechanism (Artobolevsky I. I., "The mechanisms in modern technique," Moscow: "Science", vol. 2, 1979, p. 15, example 872), consisting of an intermediate member with two end elements for progressive movements. Forces on the end element, speed of movement thereof and angular velocity of the intermediate member in such a mechanism are defined by following formulas:

$$P_2 = P_1(\sin \alpha_1 / \sin \alpha_2) - \Delta P;$$

$$V_2 = V_1(\cos \alpha_1 / \cos \alpha_2);$$

$$\omega = V_1/(L \sin \alpha_1) = V_2/(L \sin \alpha_2); \quad (1)$$

wherein: $P_2$, $P_1$ are forces on the end elements; $V_2, V_1$ are speeds thereof respectively; $\alpha_2$ $\alpha_1$ are angles between the plane containing the geometric axes of supporting surfaces of the end elements and directions of the end element movement; $\Delta P$ is a reduction of force due to friction; and $\omega$ is a angular velocity of the intermediate member.

In such mechanisms the forces acting on the end elements may be balanced by torque acting on the intermediate member in accordance with formula:

$$M + P_1 L \sin \alpha_1 + P_2 L \sin \alpha_2 + \Delta = 0;$$

where M is a torque on the intermediate member; $\Delta$ is loss of force or torque due to friction, and other symbols are as defined above.

Such a mechanism can be used for mutual transformation of progressive and rotative movements with respective transformation of forces and torques.

Without taking into consideration loss due to friction, the force on one of the end elements may be unlimitedly great while the mechanism is in a certain position, whereas the force on the other end element or torque on the intermediate member is limited.

However sliding of loaded supporting surfaces causes intensive wear-and-tear, expenses to maintain reliability, and substantial reduction of the force capability of such mechanism. These deficiencies cause the use of antifriction materials, compound lubricating systems and ball or roller bearings. But the supporting surfaces continue to be the most vulnerable parts of such mechanisms.

SUMMARY OF THE INVENTION

Therefore an object of this invention is to reduce the losses and to raise force and speed capabilities of such a mechanism for transformation of progressive and rotary movement by elimination of sliding friction.

Elimination of sliding friction is provided by supporting surfaces that roll on each other without slipping when the end elements make progressive movements. For this the axis of mutual turning of the prior end element and the intermediate member is replaced by a line of contact between supporting surfaces.

We have named this mechanism "Axoid Force Mechanism" (hereinafter AFM).

In the connections of the AFM slipping is theoretically eliminated. Therefore wear-and-tear, loss of power, and sensibility to lubrication are substantially reduced. Force capacity and endurance are increased as a result of the use of materials with high contact endurance for which antifriction properties are no longer essential.

The intermediate member can consist of several contact elements, which may be placed either in parallel or in succession.

It is necessary that the number of contact elements and radiuses of a supporting axoids curvature in the each succession thereof meet the following formula for the end elements not to slip in supporting the progressive movement, including the end elements:

$$\prod_{j=1}^{k+1} \left( -\frac{\rho_{(2j-1)}}{\rho_{(2j)}} \right) = 1$$

wherein: k is number of contact elements in that succession; $\rho_{(2j-1)}$, $\rho_{(2j)}$ are curvature radiuses of the supporting axoids in the area of j-th contact.

Circular cylinder supporting surfaces are most preferable for the end elements and intermediate member.

DETAILED DESCRIPTION OF INVENTION

Figure 1:
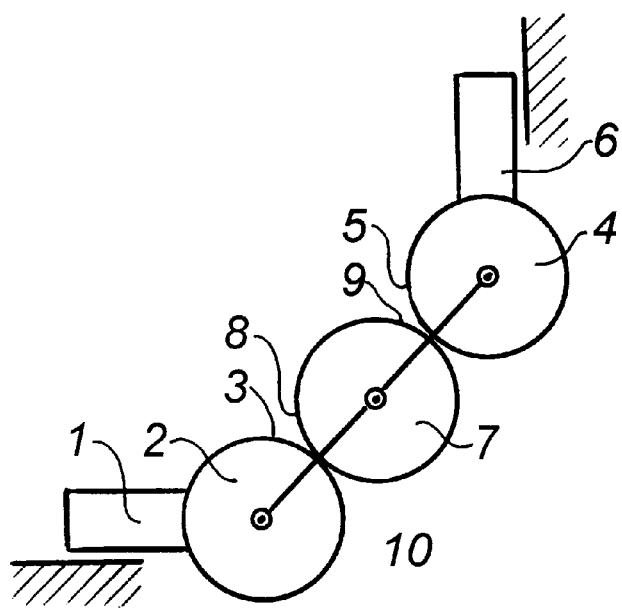
FIG. 1 is a front elevational schematic view of a first embodiment in a position where forces on end elements are approximately equal.

In the embodiment shown in FIG. 1 the end element 1, which receives progressive movement in a direction from a drive (not shown), is provided with a stock 2 with supporting surface 3 of circular cylinder form or, more particularly, a portion thereof. The end element 6, which is progressively movable in a direction perpendicular to the direction of the end element 1, is provided with a similar stock 4 and supporting surface 5.

The intermediate member 7 of circular cylinder form is placed between the stocks 2 and 4. One portion of its supporting surface 8 is in contact with the supporting surface 3 of the stock 2 and an opposite portion of its supporting surface 9 is in contact with the supporting surface 5 of the stock 4. The intermediate member 7 is fixed between the stocks 2 and 4 by retaining elements 10, which in this embodiment are hinged to axes of the stocks 2 and 4.

Figure 2:
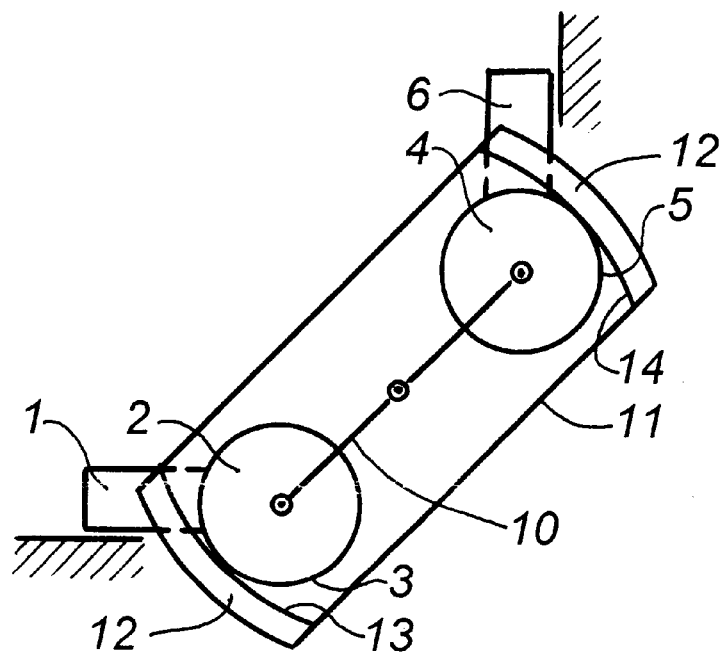
FIG. 2 is a front elevational schematic view of a second embodiment in a position where forces on end elements are approximately equal.

In the embodiment shown in FIG. 2 the intermediate member 11 is a unit of two plates 12 connected to each other and provided with opposite internally cylindrical supporting surfaces 13 and 14. The supporting surface 13 contacts the supporting surface 3 of the stock 2 and the supporting surface 14 contacts with the supporting surface 5 of the stock 4.

Figure 5:
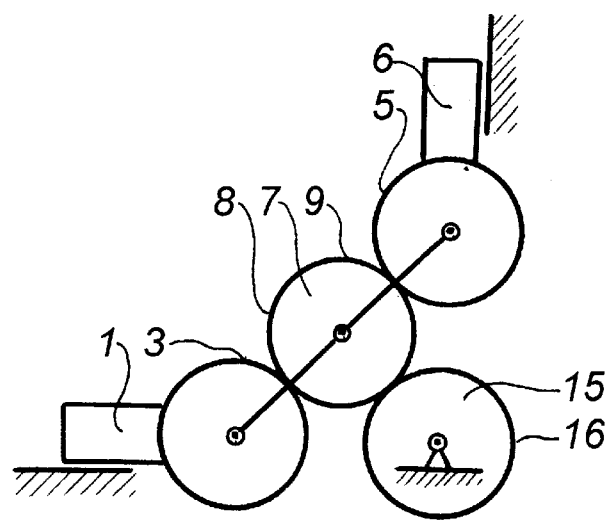
FIG. 5 is a front elevational schematic view of the first embodiment with additional structure to give or receive torque from an intermediate member.

Rotary movement can be obtained from the intermediate member 7 when the end elements 1 and 6 are driven in their progressive movements or the end elements 1 and 6 can be driven when the intermediate member 7 is provided with torque by a drive element 15 (see FIG. 5), which contacts one of the supporting surfaces 8 or 9 of the intermediate member 7 with a supporting surface 16.

All or some of the supporting surfaces 3, 5, 8, 9, 16 may be provided with teeth (not shown) to gear with each other.

Figure 6:
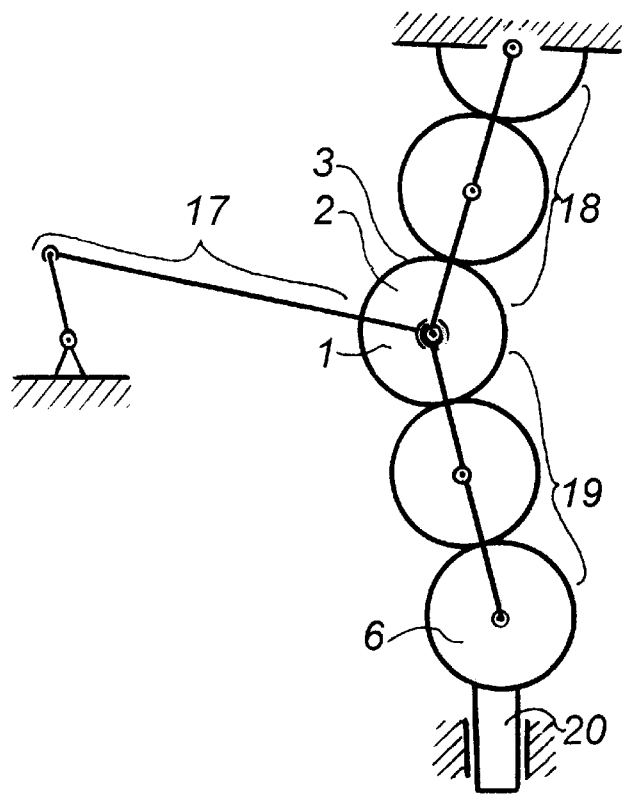
FIG. 6 is a front elevational schematic view of another embodiment.

The AFM can be used as shown in FIG. 6., for example. A crank mechanism 17 is connected with end element 1, which is provided with a stock 2 with the supporting surface 3 and is the first element of further AFMs 18 and 19. The second end element of AFM 19 is rigidly connected to a frame. The second end element of AFM 20 is a progressively movable end element 20.

The AFM works as follows:

The force, which acts on the end element 1, moves it together with its stock 2. Therefore the supporting surface of its intermediate member 7 rolls on supporting surface 3 of stock 2, and the opposite supporting surface 9 of the intermediate member transmits this movement to stock 4 by rolling of its supporting surface 9 on the supporting surface 5. This interaction of the supporting surfaces 3–8 and 9–5 takes place by rolling without slipping.

Figure 4:
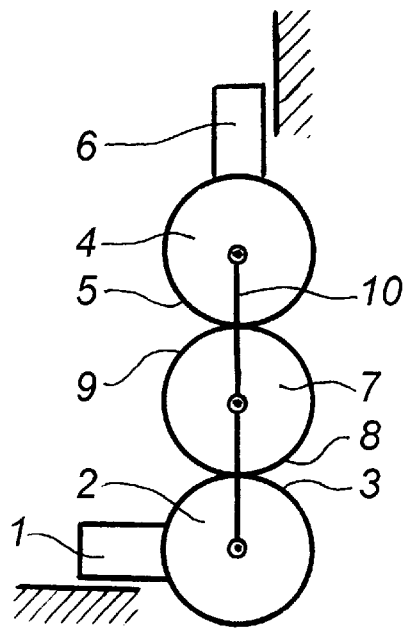
FIG. 4 is a front elevational schematic view of the first embodiment in a position where the force on one of the end elements is maximum and the force on the other end element or torque on its supporting surface is confined.

FIG. 4 shows the state of the AFM of FIG. 1, when in accordance with formulas (1), a speed of the progressive movement of the end element 6 is zero and the force on end element 6 is maximal whereas the force on end element 1 is zero.

Figure 3:
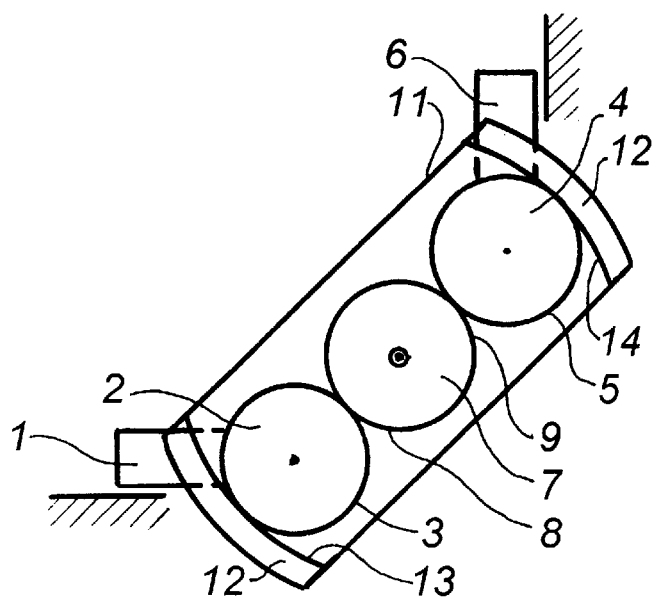
FIG. 3 is a front elevational schematic view of a third embodiment in a position where forces on end elements are approximately equal.

In the embodiment of FIGS. 2 and 3, when the end element 1 moves in the reverse direction (left in the Figs.), then the stock 2 drags the intermediate member 11 as its supporting surface 13 rolls on the supporting surface 3 of the stock 2. The movement of the intermediate member 11 causes rolling of the supporting surface 14 on the supporting surface 5 of the stock 4 and thereby moves the end element 6 down.

If great forces for returning the AFM to its initial position are not necessary, then the AFM need not contain the second intermediate member 7 shown in FIG. 3, and its return can be made by retaining elements 10 as shown in in FIG. 2.

It is obvious that the intermediate member 7 makes a complicated movement: turning around its own geometrical axis, which moves in a circle, whereas the end elements 1 and 6 only make progressive movements. Therefore, constructing the supporting surfaces 3, 5, 8, 9 and 16 to carry a torque allows the AFM to give or receive power to or from rotative movement of the drive element 15.

An AFM (for example such as shown in FIG. 6) can function as follows. Power is transmitted by a crank mechanism 17 to the end element 1, which is common for AFMs 18 and 19. That movement is transmitted to working element 20 with force increasing to the end of the stroke.

What is claimed is:

1. An axoid force mechanism, comprising two end elements connected with an intermediate member for transmission of movement through supporting surfaces that roll on each other with forces and speeds in accordance with formulas:

$$P_2 = P_1(\sin \alpha_1/\sin \alpha_2) - \Delta P; \quad V_2 = V_1(\cos \alpha_1/\cos \alpha_2);$$

where: $P_2$, $P_1$ are forces on the end elements; $V_2$, $V_1$ are speeds of the end elements; $\alpha_2$, $\alpha_1$ are angles formed by planes passing through axes of the supporting surfaces defining directions of movements of the end elements, and $\Delta P$ is a reduction of force due to friction, characterized in that the intermediate member consists of at least one succession of contact elements having supporting surfaces, which as well as the supporting surfaces of the end elements, are constructed and placed so, that, when one of the end elements moves progressively, the supporting surfaces roll without slipping to transmit forces and movement to the other of the end elements, wherein radii of the supporting surfaces in each succession satisfy the following formula:

$$\prod_{j=1}^{k+1}\left(-\frac{\rho(2j-1)}{\rho(2j)}\right) = 1$$

where: k is number of contact elements in this succession; and $\rho(2j-1)$, $\rho(2j)$ are curvature radii of the supporting surfaces in area of j-th contact.

2. The axoid force mechanism as defined in claim 1, characterized in that the supporting surfaces are at least portions of circular cylinders and are placed so that their geometrical axes and lines of their contact are placed in a common plane.

3. The axoid force mechanism defined in claim 2, characterized in that the supporting surfaces have gear-like structures for torque transmission.

4. The axoid force mechanism as defined in claim 2, characterized in that the intermediate member has supporting surfaces between supporting surfaces of the end elements for contact with them, and further comprising retaining elements for supporting the end elements and intermediate member.

5. The axoid force mechanism defined in claim 4, characterized in that the supporting surfaces have gear-like structures for torque transmission.

6. The axoid force mechanism as defined in claim 2, and further comprising a second intermediate member, wherein supporting surfaces of one of the intermediate elements are between and contacting supporting surfaces of the end elements which are between and contacting supporting surfaces of the second intermediate member.

7. The axoid force mechanism defined in claim 6, characterized in that the supporting surfaces have gear-like structures for torque transmission.

8. The axoid force mechanism as defined in claim 1, characterized in that the intermediate member has supporting surfaces between supporting surfaces of the end elements for contact with them, and further comprising retaining elements for supporting the end elements and intermediate member.

9. The axoid force mechanism defined in claim 8, characterized in that the supporting surfaces have gear-like structures for torque transmission.

10. The axoid force mechanism defined in claim 1, characterized in that the supporting surfaces have gear-like structures for torque transmission.

11. An axoid force mechanism, comprising:

first and second end elements, at least one of the end elements being arranged for progressive movement;

first and second stocks respectively on the first and second end elements, the first and second stocks respectively having first and second supporting surfaces that are at least portions of circular cylinders; and a first intermediate member having first and second supporting surfaces that are at least portions of circular cylinders respectively engaged with the first and second supporting surfaces of the first and second stocks for rolling thereon when the one of the end elements moves progressively.

12. The axoid force mechanism according to claim 11, wherein the first and second supporting surfaces of the intermediate member are one of convex and concave.

13. The axoid force mechanism according to claim 12, and further comprising a second intermediate member having first and second supporting surfaces that are at least portions of circular cylinders respectively engaged with the first and second supporting surfaces of the first and second stocks for rolling thereon when the one of the end elements moves progressively.

14. The axoid force mechanism according to claim 12, and further comprising retaining elements connecting the first and second stocks.

15. The axoid force mechanism according to claim 14, and further comprising a second intermediate member having first and second supporting surfaces that are at least portions of circular cylinders respectively engaged with the first and second supporting surfaces of the first and second stocks for rolling thereon when the one of the end elements moves progressively.

16. The axoid force mechanism according to claim 15, wherein at least the first supporting surface of the first intermediate member and stock are engaged with gear teeth.

17. The axoid force mechanism according to claim 16, and further comprising a drive element engaging the first intermediate member for receiving or imparting rotation.

18. The axoid force mechanism according to claim 12, wherein at least the first supporting surface of the first intermediate member and stock are engaged with gear teeth.

19. The axoid force mechanism according to claim 12, and further comprising a drive element engaging the first intermediate member for receiving or imparting rotation.

20. The axoid force mechanism according to claim 11, and further comprising retaining elements connecting the first and second stocks.

21. The axoid force mechanism according to claim 20, and further comprising a second intermediate member having first and second supporting surfaces that are at least portions of circular cylinders respectively engaged with the first and second supporting surfaces of the first and second stocks for rolling thereon when the one of the end elements moves progressively.

22. The axoid force mechanism according to claim 20, wherein at least the first supporting surface of the first intermediate member and stock are engaged with gear teeth.

23. The axoid force mechanism according to claim 20, and further comprising a drive element engaging the first intermediate member for receiving or imparting rotation.

24. The axoid force mechanism according to claim 11, and further comprising a second intermediate member having first and second supporting surfaces that are at least portions of circular cylinders respectively engaged with the first and second supporting surfaces of the first and second stocks for rolling thereon when the one of the end elements moves progressively.

25. The axoid force mechanism according to claim 24, wherein at least the first supporting surface of the first intermediate member and stock are engaged with gear teeth.

26. The axoid force mechanism according to claim 24, and further comprising a drive element engaging the first intermediate member for receiving or imparting rotation.

27. The axoid force mechanism according to claim 11, wherein at least the first supporting surface of the first intermediate member and stock are engaged with gear teeth.

28. The axoid force mechanism according to claim 27, and further comprising a drive element engaging the first intermediate member for receiving or imparting rotation.

29. The axoid force mechanism according to claim 11, and further comprising a drive element engaging the first intermediate member for receiving or imparting rotation.

* * * * *